US008514961B2

(12) United States Patent
Papadopoulos (10) Patent No.: US 8,514,961 B2
(45) Date of Patent: Aug. 20, 2013

(54) METHOD AND APPARATUS FOR DISTRIBUTED SPACE-TIME CODING IN WIRELESS RADIO NETWORKS

(75) Inventor: Haralabos Papadopoulos, San Jose, CA (US)

(73) Assignee: NTT DoCoMo, Inc., Tokyo (JP)

( * ) Notice: Subject to any disclaimer, the term of this patent is extended or adjusted under 35 U.S.C. 154(b) by 711 days.

(21) Appl. No.: 12/700,585

(22) Filed: Feb. 4, 2010

(65) Prior Publication Data
US 2011/0188596 A1 Aug. 4, 2011

(51) Int. Cl.
*H04B 7/02* (2006.01)
(52) U.S. Cl.
USPC ........... 375/267; 375/299; 375/347; 455/101; 455/456.6; 455/517; 455/525
(58) Field of Classification Search
None
See application file for complete search history.

(56) References Cited

U.S. PATENT DOCUMENTS

| 5,903,842 | A | 5/1999 | Wang |
| 5,982,327 | A | 11/1999 | Vook et al. |
| 6,629,287 | B1 | 9/2003 | Brink |
| 6,804,307 | B1 | 10/2004 | Popovic |
| 6,862,552 | B2 | 3/2005 | Goldstein et al. |
| 6,901,117 | B1 | 5/2005 | Classon et al. |
| 7,042,856 | B2 | 5/2006 | Walton et al. |
| 7,042,858 | B1 | 5/2006 | Ma et al. |
| 7,072,295 | B1 | 7/2006 | Benson et al. |
| 7,095,812 | B2 | 8/2006 | Chan et al. |
| 7,251,768 | B2 | 7/2007 | Giannakis et al. |
| 7,308,047 | B2 | 12/2007 | Sadowsky |
| 7,310,369 | B1 | 12/2007 | Krieger et al. |
| 7,436,895 | B1 | 10/2008 | Tujkovic |
| 7,441,045 | B2 | 10/2008 | Skene et al. |
| 7,443,925 | B2 | 10/2008 | Mehta et al. |
| 7,564,915 | B2 | 7/2009 | Lee et al. |
| 7,620,117 | B2 | 11/2009 | Chae et al. |
| 7,877,097 | B2 | 1/2011 | Zhu et al. |
| 7,877,108 | B2 | 1/2011 | Wengerter et al. |

(Continued)

FOREIGN PATENT DOCUMENTS

| EP | 1162750 A2 | 12/2001 |
| EP | 1383246 A2 | 1/2004 |

(Continued)

OTHER PUBLICATIONS

US Final Office Action for U.S. Appl. No. 12/040,653, dated Jun. 15, 2010, 40 pages.

(Continued)

*Primary Examiner* — Adolf Dsouza
(74) *Attorney, Agent, or Firm* — Blakely, Sokoloff, Taylor & Zafman LLP (57) ABSTRACT

A method and apparatus is disclosed herein for performing distributed space-time coding. In one embodiment, the distributed space-time coding is used for downlink communications in wireless radio networks. In one embodiment, the method comprises storing information-bearing sequence at two or more base stations in a group of base stations; and transmitting data corresponding to the information-bearing sequence from a number of base stations for receipt by a receiver of a user, where the number of base stations is not globally known a priori and indicates a diversity of order, such that the diversity of order M is obtained if a total of M number of antennas spread over multiple base stations transmit the information-bearing sequence, where M is an integer.

7 Claims, 6 Drawing Sheets

(56) References Cited

U.S. PATENT DOCUMENTS

| | | | |
|---|---|---|---|
| 8,027,407 B2 | 9/2011 | Papadopoulos | |
| 8,042,031 B2 | 10/2011 | Chen et al. | |
| 2002/0114404 A1 | 8/2002 | Aizawa et al. | |
| 2002/0176431 A1 | 11/2002 | Golla et al. | |
| 2003/0236080 A1 | 12/2003 | Kadous et al. | |
| 2004/0013180 A1* | 1/2004 | Giannakis et al. | 375/219 |
| 2004/0022179 A1 | 2/2004 | Giannakis et al. | |
| 2004/0116146 A1 | 6/2004 | Sadowsky et al. | |
| 2004/0165675 A1 | 8/2004 | Ito et al. | |
| 2004/0205445 A1 | 10/2004 | Xu | |
| 2005/0010675 A1 | 1/2005 | Jaggi et al. | |
| 2005/0041751 A1 | 2/2005 | Nir et al. | |
| 2005/0047514 A1 | 3/2005 | Bolinth et al. | |
| 2005/0068918 A1 | 3/2005 | Mantravadi et al. | |
| 2005/0111592 A1 | 5/2005 | Yee | |
| 2005/0152391 A1 | 7/2005 | Effros et al. | |
| 2005/0185707 A1 | 8/2005 | Hoo et al. | |
| 2005/0265280 A1 | 12/2005 | Roh et al. | |
| 2006/0002312 A1 | 1/2006 | Delattre et al. | |
| 2006/0020560 A1 | 1/2006 | Rodriguez et al. | |
| 2006/0029124 A1 | 2/2006 | Grant et al. | |
| 2006/0098760 A1 | 5/2006 | Shen et al. | |
| 2006/0146716 A1 | 7/2006 | Lun et al. | |
| 2006/0146791 A1 | 7/2006 | Deb et al. | |
| 2006/0148506 A1 | 7/2006 | Hoo | |
| 2006/0176945 A1 | 8/2006 | Li | |
| 2007/0041475 A1 | 2/2007 | Koshy et al. | |
| 2007/0066229 A1 | 3/2007 | Zhang et al. | |
| 2007/0198899 A1 | 8/2007 | Yellin et al. | |
| 2007/0213013 A1 | 9/2007 | Kim | |
| 2007/0281633 A1 | 12/2007 | Papadopoulos | |
| 2007/0286313 A1 | 12/2007 | Nikopour-Deilami et al. | |
| 2008/0025430 A1 | 1/2008 | Sadowsky | |
| 2008/0032630 A1 | 2/2008 | Kim et al. | |
| 2008/0075022 A1 | 3/2008 | Lei et al. | |
| 2008/0092028 A1 | 4/2008 | Orio | |
| 2008/0101310 A1 | 5/2008 | Marzetta | |
| 2008/0123781 A1 | 5/2008 | Pisek et al. | |
| 2008/0181339 A1 | 7/2008 | Chen et al. | |
| 2008/0212526 A1 | 9/2008 | Oyman | |
| 2009/0082054 A1 | 3/2009 | Li et al. | |
| 2009/0213954 A1 | 8/2009 | Bursalioglu et al. | |
| 2009/0225878 A1 | 9/2009 | Papadopoulos et al. | |
| 2009/0268684 A1 | 10/2009 | Lotti et al. | |
| 2009/0285323 A1 | 11/2009 | Sundberg et al. | |
| 2009/0291699 A1 | 11/2009 | Heath et al. | |
| 2009/0296842 A1 | 12/2009 | Papadopoulos et al. | |

FOREIGN PATENT DOCUMENTS

| | | |
|---|---|---|
| EP | 1411693 A2 | 4/2004 |
| EP | 1521386 A2 | 4/2005 |
| EP | 1530387 A1 | 5/2005 |
| EP | 1648097 A | 4/2006 |
| EP | 1648097 A2 | 4/2006 |
| EP | 1827040 A1 | 8/2007 |
| EP | 1863208 A1 | 12/2007 |
| GB | 2304495 | 3/1997 |
| GB | 2407007 A | 4/2005 |
| KR | 1020060063478 A | 6/2006 |
| WO | WO 01/43293 A1 | 6/2001 |
| WO | WO 2004/045167 A | 5/2004 |
| WO | WO 2004/025011 A1 | 7/2004 |
| WO | WO 2005/046081 A1 | 5/2005 |
| WO | WO 2006/029050 A | 3/2006 |
| WO | WO 2007/050860 A1 | 5/2007 |
| WO | WO 2007/073267 A1 | 6/2007 |
| WO | WO 2004/056011 A1 | 7/2007 |
| WO | WO 2007/087540 A2 | 8/2007 |
| WO | WO 2007/129990 A1 | 11/2007 |
| WO | WO 2008/057791 A1 | 5/2008 |
| WO | WO 2008/143973 A1 | 11/2008 |
| WO | WO 2009/033023 A2 | 3/2009 |
| WO | WO 2010/019618 A2 | 2/2010 |

OTHER PUBLICATIONS

US Final Office Action for U.S. Appl. No. 11/644,638, dated Apr. 29, 2010, 22 pages.
Korean Office Action for corresponding Korean Patent Application No. 2008-7023249, dated May 27, 2010, 4 Pgs.
European Office Action for corresponding European Patent Application No. 07862325.3, dated Jul. 6, 2010, 6 pgs.
PCT International Search Report for PCT Patent Application No. PCT/US2009/053472, dated Jun. 14, 2010, 7 pgs.
Written Opinion of the International Searching Authority for PCT Patent Application No. PCT/US2009/053472, dated Jun. 14, 2010, 5 pgs.
US Final Office Action for U.S. Appl. No. 11/873,248, dated Sep. 1, 2010, 21 pages.
US Office Action for U.S. Appl. No. 11/939,353 dated Jan. 31, 2011, 15 pages.
Sen, et al., "Cute and jCUTE Concolic Unit Testing and Explicit Path Model-Checking Tool", Computer Aided Verification Lecture Notes in Computer Science, Jan. 1, 2006, pp. 419-423.
Majumdar, et al., "Hybrid Concolic Testing", IEEE 29th International Conference on Software Engineering, May 1, 2007, pp. 416-426.
PCT International Preliminary Report on Patentability for PCT Patent Application No. PCT/US2009/046014, dated Dec. 16, 2010, 9 pages.
PCT International Search Report for PCT Patent Application No. PCT/US2010/033549, Jan. 5, 2011, 5 pgs.
PCT Written Opinion of the International Searching Authority for PCT Patent Application No. PCT/US2010/033549, Jan. 5, 2011, 6 pgs.
European Office Action for European Patent Application No. 08767750.6, dated Jan. 12, 2011, 6 pgs.
PCT International Search Report for PCT Patent Application No. PCT/US2010/027139, Dec. 6, 2010, 5 pgs.
PCT Written Opinion of the International Searching Authority for PCT Patent Application No. PCT/US2010/027139, Dec. 6, 2011, 6 pgs.
European Office Action for European Patent Application No. 08767751.4, Jan. 14, 2011, 5 pgs.
US Office Action for U.S. Appl. No. 12/538,733, Oct. 18, 2011, 11 pgs.
US Office Action for U.S. Appl. No. 12/538,739, Dec. 7, 2011, 23 pgs.
US Final Office Action for U.S. Appl. No. 12/538,733, Mar. 27, 2012, 6 pgs.
US Final Office Action for U.S. Appl. No. 12/335,409, Mar. 19, 2012, 22 pgs.
US Office Action for U.S. Appl. No. 12/335,389, Apr. 12, 2012, 20 pgs.
PCT International Preliminary Report on Patentability for PCT Patent Application No. PCT/US2010/033549, Nov. 17, 2011, 7 pgs.
US Notice of Allowance for U.S. Appl. No. 11/754,903, Mar. 12, 2012, 8 pgs.
Papadogiannis, et al., "A Dynamic Clustering Approach in Wireless Networks with Multi-Cell Cooperative Processing", IEEE International Conference on Communications, May 19, 2008, pp. 4033-4037.
PCT International Preliminary Report on Patentability for PCT Patent Application No. PCT/US2009/053466, dated Feb. 24, 2011, 9 pages.
PCT International Preliminary Report on Patentability for PCT Patent Application No. PCT/US2009/053471, dated Feb. 24, 2011, 9 pages.
PCT International Preliminary Report on Patentability for PCT Patent Application No. PCT/US2009/054937, dated Mar. 10, 2011, 8 pages.
PCT International Preliminary Report on Patentability for PCT Patent Application No. PCT/US2009/056865, dated Mar. 24, 2011, 12 pgs.
European Office Action for European Patent Application No. 07862325.3, Apr. 7, 2011, 6 pgs.

US Notice of Allowance for U.S. Appl. No. 12/538,733, dated Apr. 26, 2012, 6 pgs.
US Office Action for U.S. Appl. No. 12/476,066, dated May 30, 2012, 14 pgs.
US Notice of Allowance for U.S. Appl. No. 12/335,409, dated Jul. 19, 2012, 8 pgs.
US Office Action for U.S. Appl. No. 12/546,471, dated May 21, 2012, 11 pgs.
US Office Action for U.S. Appl. No. 12/209,110, dated Jun. 12, 2012, 39 pgs.
US Notice of Allowance for U.S. Appl. No. 11/644,638, dated Jun. 9, 2011, 11 pgs.
US Notice of Allowance for U.S. Appl. No. 12/121,634, dated Aug. 12, 2011, 9 pgs.
Li, et al., "Full Diversity Distributed Space-Time Trellis Codes for Asynchronous Cooperative Communications", Proceeding of the IEEE 2005 International Symposium on Information Theory, Sep. 4, 2005, 6 pgs., Adelaide, South Australia, Australia.
Jing, et al., "Distributed Space-Time Codes in Wireless Relay Networks", 2004 IEEE Sensor Array and Multichannel Signal Processing Workshop, Jul. 21, 2004, pp. 249-253.
Japanese Office Action for related Japanese Patent Application No. 2009-513327, Aug. 7, 2012, 3 pgs. *English Translation*.
US Final Office Action for U.S. Appl. No. 12/209,110, dated Jul. 14, 2011, 26 pgs.
US Office Action for U.S. Appl. No. 12/335,409, dated Aug. 16, 2011, 20 pgs.
US Notice of Allowance for U.S. Appl. No. 11/664,638, dated Jun. 9, 2011, 10 pgs.
US Office Action for U.S. Appl. No. 11/754,903, dated Jun. 6, 2011, 11 pgs.
US Office Action for U.S. Appl. No. 11/644,638, dated Sep. 30, 2010, 24 pages.
US Office Action for U.S. Appl. No. 11/939,353, dated Sep. 22, 2010, 15 pages.
Korean Office Action for corresponding Korean Patent Application No. 2008-7025123, dated Sep. 29, 2010, 3 Pgs.
PCT International Preliminary Report on Patentability for PCT Patent Application No. PCT/US2009/035735, dated Sep. 16, 2010, 8 pages.
European Office Action for corresponding European Patent Application No. 07861675.2, dated Jul. 26, 2010, 4 pgs.
US Office Action for U.S. Appl. No. 11/754,903, dated Sep. 20, 2010, 18 pages.
US Office Action for U.S. Appl. No. 12/209,110 dated Feb. 11, 2011, 20 pages.
US Office Action for U.S. Appl. No. 12/121,649, Apr. 19, 2011, 25 pgs.
US Office Action for U.S. Appl. No. 12/130,821, Feb. 22, 2011, 12 pgs.
US Office Action for U.S. Appl. No. 12/121,634, Mar. 1, 2011, 19 pgs.
US Office Action for U.S. Appl. No. 11/644,638, Apr. 15, 2011, 7 pgs.
European Office Action for European Patent Application No. 09718026.9, Feb. 10, 2011, 3 pgs.
European Office Action for European Patent Application No. 08756664.2, Mar. 17, 2011, 6 pgs.
PCT International Search Report dated Sep. 18, 2008, for PCT/US08/006286, filed May 16, 2008, 4 pages.
Written Opinion of the International Searching Authority dated Sep. 18, 2008, for PCT/US08/006286, filed May 16, 2008, 8 pages.
International Search Report mailed Nov. 6, 2008 for PCT/US08/065675, filed Jun. 3, 2008, 5 pages.
Written Opinion of the International Searching Authority mailed Nov. 6, 2008 for PCT/US08/065675, filed Jun. 3, 2008, 8 pages.
International Search Report for related application WO 08/048651, dated Jun. 25, 2008.
Written Opinion of the International Searching Authority for related application WO 08/048651, dated Jun. 25, 2008.
Communication Relating to the Results of the Partial International Search dated Jan. 31, 2009 for PCT/US07/13074, filed Jun. 1, 2007.
PCT International Search Report dated Apr. 14, 2008 for PCT/US07/23207, 3 pages.
Written Opinion of the International Searching Authority dated Apr. 14, 2008 for PCT/US07/23207, 6 pages.
International Search Report dated Apr. 15, 2008 for PCT/US07/24572, 4 pages.
Written Opinion of the International Searching Authority dated Apr. 15, 2008 for PCT/US07/24572, 6 pages.
PCT International Search Report dated Aug. 20, 2008 for PCT/US08/03274, 4 pages.
Written Opinion of the International Searching Authority dated Aug. 20, 2008 for PCT/US08/03274, 10 pages.
International Search Report dated Apr. 17, 2009 for PCT/US2008/076252, 5 pages.
Written Opinion of the International Searching Authority dated Apr. 17, 2008 for PCT/US2008/076252, 9 pages.
Written Opinion of the International Searching Authority dated Apr. 30, 2009 for PCT/US2007/022189, 8 pages.
PCT International Search Report for PCT Patent Application No. PCT/US2009/035735, dated Jul. 13, 2009, 5 pages.
Written Opinion of the International Searching Authority for PCT Patent Application No. PCT/US2009/035735, dated Jul. 13, 2009, 8 pages.
PCT International Preliminary Report on Patentability for PCT Patent Application No. PCT/US2008/003274, dated Sep. 24, 2009, 10 pages.
PCT International Search Report for PCT Patent Application No. PCT/US2007/013074, dated Dec. 2, 2009, 8 pgs.
Written Opinion of the International Searching Authority for PCT Patent Application No. PCT/US2007/013074, dated Dec. 2, 2009, 8 pgs.
PCT International Search Report for PCT Patent Application No. PCT/US2009/046014, dated Nov. 27, 2009, 7 pgs.
Written Opinion of the International Searching Authority for PCT Patent Application No. PCT/US2009/046014, dated Nov. 27, 2009, 8 pgs.
PCT International Preliminary Report on Patentability for PCT Patent Application No. PCT/US2007/013074, dated Dec. 30, 2009, 8 pages.
PCT International Search Report for PCT Patent Application No. PCT/US2008/006287, dated Oct. 2, 2008, 6 pgs.
Written Opinion of the International Searching Authority for PCT Patent Application No. PCT/US2008/006287, dated Oct. 2, 2008, 7 pgs.
PCT International Preliminary Report on Patentability for PCT Patent Application No. PCT/US2008/065675, dated Dec. 17, 2009, 8 pages.
PCT International Search Report for PCT Patent Application No. PCT/US2009/054937, dated Dec. 30, 2009, 7 pgs.
Written Opinion of the International Searching Authority for PCT Patent Application No. PCT/US2009/054937, dated Dec. 30, 2009, 7 pgs.
PCT International Search Report for PCT Patent Application No. PCT/US2009/56865, dated Mar. 2, 2010, 7 pgs.
Written Opinion of the International Searching Authority for PCT Patent Application No. PCT/US2009/56865, dated Mar. 2, 2010, 12 pgs.
PCT International Search Report for PCT Patent Application No. PCT/US2009/034758, dated Feb. 4, 2010, 7 pgs.
Written Opinion of the International Searching Authority for PCT Patent Application No. PCT/US2009/034758, dated Feb. 4, 2010, 7 pgs.
US Office Action for U.S. Appl. No. 12/040,653, dated Dec. 11, 2009, 33 pages.
US Office Action for U.S. Appl. No. 11/644,638, dated Sep. 22, 2009, 13 pages.
US Office Action for U.S. Appl. No. 11/754,903, dated Mar. 29, 2010, 11 pages.
US Office Action for U.S. Appl. No. 11/873,248, dated Mar. 31, 2010, 18 pages.
Lattice Semiconductor Corp., "Turbo Decoder", IP Data Sheet, 2003, 6 pages.
Kao, Chien-Yu, "A Bi-directional SOVA with Normalization for Turbo Decoding", Jun. 2006, Tainan, Taiwan, 72 pages.

Chindapol, Aik, et al., "Design, Analysis, and Performance Evaluation for BICM-ID with Square QAM Constellations in Rayleigh Fading Channels", IEEE Journal on Selected Areas in Communications, vol. 19, No. 5, May 2001, pp. 944-957.

Alamouti, Siavash M., "A Simple Transmit Diversity Technique for Wireless Communications", IEEE Journal on Select Areas in Communications, vol. 16, No. 8, Oct. 1998, pp. 1451-1458.

Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.

Hagenauer, Joachim, et al., "The Performance of Rate-Compatible Punctured Convolutional Codes for Digital Mobile Radio", IEEE Transactions on Communications, vol. 38, No. 7, Jul. 1990, pp. 966-980.

Lee, Inkyu, et al., "Space-Time Bit-Interleaved Coded Modulation for OFDM Systems", IEEE Transactions on Signal Processing, vol. 52, No. 3, Mar. 2004, pp. 820-825.

Lee, Heunchul, et al., "A Flexible Space-Time Coding System with Unequal Error Protection", IEEE, 2005, 5 pages.

Lee, Inkyu, et al., "Reduced-Complexity Receiver Structures for Space-Time Bit-Interleaved Coded Modulation Systems", IEEE Transactions on Communications, vol. 55, No. 1, Jan. 2007, pp. 142-150.

Lee, Inkyu, et al., "Code Construction for Space-Time Bit-Interleaved Coded Modulation Systems", IEEE Communications Society, 2004, 5 pages.

Li, Xiaodong, et al., "Bit-Interleaved Coded Modulation with Iterative Decoding and 8PSK Signaling", IEEE Transactions on Communications, vol. 50, No. 8, Aug. 2002, pp. 1250-1257.

Lee, Inkyu, et al., "Code Design of Space-Time Bit-Interleaved Coded Modulation Systems for Maximum Diversity", ICC, Jun. 2004, 11 pages.

Taddei, Herve, et al., Mode Adaptive Unequal Error Protection for Transform Predictive Speech and Audio Coders, IEEE, 2002, pp. 165-168.

Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.

Wong, K., "The Soft-Output M-Algorithm and Its Applications", PhD Thesis, Queens University, Kingston, Canada, Aug. 2006, 263 pages.

Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.

Seshadri, N., et al., "List Viterbi Decoding Algorithms with Applications", IEEE Transactions on Communications, vol. 42, No. 2/3/4, Feb./Mar./Apr. 1994, pp. 313-323.

Taoka, H., et al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.

Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.

Wong, K.K.Y., et al., "Low-complexity space-time turbo equalizer with the soft-output M-algorithm for frequency-selective channels", IEEE International Conference on Communications, vol. 4, May 2005, pp. 2251-2255.

Wong, K.K.Y., et al., "Bi-directional soft-output m-algorithm for iterative decoding", IEEE International Conference on Communications, vol. 2, Jun. 2004, pp. 792-797.

Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.

Papadopoulos, H., et al., "Wideband space-time coded systems with non-collocated antennas", Radio and Wireless Symposium, 2008 IEEE, Jan. 22, 2008, pp. 307-310.

Lee, Inkyu, et al., "Diversity Analysis for Space-Time, Bit-Interleaved Coded Modulation Systems", Korea University, Seoul, Korea, Jan. 2007.

Gencata, et al., "Virtual-topology adaptation for WDM mesh networks under dynamic traffic," Proceedings of IEEE Infocom 2002, vol. 1, Jun. 23, 2002, pp. 48-56.

Koetter, R., et al., "Beyond routing: an algebraic approach to network coding," Proceedings of IEEE Infocom 2002, vol. 1, Jun. 23, 2002, pp. 122-130.

Del Re, Enrico, et al., "Next-Generation Mobile Satellite Networks," IEEE Communications Magazine, vol. 40, No. 9, Sep. 1, 2002, pp. 150-159.

Ernest, P.H.H., et al., "An efficient algorithm for virtual topology reconfiguration in WDM optical ring networks," Proceedings of 10th Conference on Computer Communications and Networks, Oct. 15, 2001, pp. 55-60.

Fasolo, E., "Network coding techniques," www.cs.virginia.edu/{yw5s/Network%20coding.ppt, Mar. 7, 2004, pp. 1-14.

Chou, P.A., et al., "Network Coding for the Internet and Wireless Networks", www.eecs.umich.edu/systems/ChouSeminar.ppt, Mar. 28, 2006, pp. 1-29.

Ahlswede, R., et al., "Network Information Flow", IEEE Transactions on Information Theory, IT-46(4), Jul. 2000, pp. 1204-1216.

Ho, T., et al., "The Benefits of Coding Over Routing in a Randomized Setting", in the Proceedings of the International Symposium on Information Theory (ISIT), Jun. 2003, pp. 1-6.

Katti, S., et al., "XORs in the Air: Practical Wireless Network Coding", in the Proceedings of the ACM Special Interest Group on Data Communication (SIGCOMM), Sep. 2006, 12 pages.

Koetter, R., et al., "An Algebraic Approach to Network Coding", IEEE/ACM Transactions on Networking, vol. 11, No. 5, Oct. 2003, pp. 782-795.

Li, S. R., et al., "Linear Network Coding", IEEE Transactions on Information Theory, IT-49(2), Feb. 2003, pp. 371-381.

Chou, P.A., et al., "Practical Network Coding", 51st Allerton Conference on Communication, Control and Computing, Oct. 2003, 10 pages.

Cormen, T.H., et al., "Introduction to Algorithms", 2nd Edition, MIT Press and McGraw-Hill, 2001, pp. 643-700.

Jafarkani, H., "Space-Time Coding, Theory and Practice", Cambridge University Press, 2005.

Yiu, S., et al., "Distributed Space-Time Block Coding", IEEE Globecom 2005 Proceedings, Nov. 2005.

Su, W., et al., "Signal Constellations for Quasi-Orthogonal Space-Time Block Codes with Full Diversity", IEEE Transactions on Information Theory, Oct. 2004, pp. 2231-2347.

Jafarkani, H., "A Quasi-Orthogonal Space-Time Block Code", IEEE Transactions on Communications, Jan. 2001, 4 pages.

Tirkkonen, O. et al.: "Minimal Non-Orthogonality Rate 1 Space-Time Block Code for 3+ Transmit Antennas," IEEE 6th Int. Symp. Spread Spectrum Tech. and Appl., pp. 429-432, Sep. 2000, 4 pages.

Sharma, N. et al.: "Improved Quasi-Orthogonal Codes Through Constellation Rotation," IEEE Trans. Communications, pp. 332-335, Mar. 2003, 3 pages.

Wang, H. et al.: "Upper Bounds of Rates of Space-Time Block Codes from Complex Orthogonal Designs," IEEE Trans. Information Theory, pp. 2788-2796, Oct. 2003, 9 pages.

El Gamal, H. et al., "Distributed Space-Time Filtering for Cooperative Wireless Networks", GLOBECOM'03, Dec. 2003, pp. 1826-1830.

Sezgin, A., et al., "On EXIT-Chart Analysis of Coherent and Non-Coherent Space-Time Codes", Smart Antennas, 2004, pp. 49-56.

Horn, R.A., et al., "Matrix Analysis", Cambridge University Press, New York, 1994.

Tse, D., et al., "Fundamentals of Wireless Communication", Cambridge University Press, May 2005.

Stott, J.H., "The DVB Terrestrial (DVB-T) Specification and Its Implementation in a Practical Modem", Proceedings of the 1996 International Broadcasting Convention, IEEE Conference Publication No. 428, Sep. 1996, pp. 255-260.

Guerin, R., et al., "Quality-of-Service in Packet Networks: Basic Mechanisms and Directions", Invited Paper, Computer Networks, vol. 31, No. 3, Feb. 1999, pp. 1-16.

Zhang, H., "Service Disciplines for Guaranteed Performance Service in Packet-Switching Networks", in the Proceedings of the IEEE, vol. 83, No. 10, Oct. 1995, pp. 1-23.

Caire, G., et al., "Achievable Throughput of MIMO Downlink Beamforming and Limited Channel Information", Proceedings of IEEE PIMRC, Aug. 2007.

Medard, M., "The Effect upon Channel Capacity in Wireless Communication of Imperfect Knowledge of the Channel", IEEE Transactions on Information Theory, May 2000, pp. 935-945.

Marzetta, T.L., "How Much Training Is Required for Multi-User MIMO?", ACSSC96, Asilomar Conference Oct. 2006.

Viswanath, P., et al., "Sum Capacity of the Multiple Antenna Gaussian Broadcast Channel and Uplink-Downlink Duality", IEEE Transactions on Information Theory, Aug. 2003, pp. 1912-1923.

Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.

Joham, M., et al., "Linear Transmit Processing in MIMO Communications Systems", IEEE Transactions on Signal Processing, Aug. 2005, pp. 2700-2712.

Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.

Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.

Catt, "Non-codebook based pre-coding for E-UTRA TDD Downlink", 3rd Generation Partnership Project, Oct. 4, 2006, pp. 1-3.

Gomadam, K.S., et al., "Techniques for Multi-user MIMO with Two-way Training", IEEE International Conference on Communications, May 19, 2008, pp. 3360-3366.

Michalke, Clemens, et al., "Linear Momo Receivers vs. Tree Search Detection: A Performance Comparison Overview", IEEE Internatinal Symposium on Personal, Indoor and Mobile Radio Communications, Sep. 11, 2006, pp. 1-7.

Narayanan, K.R., et al., "Low Complexity Turbo Equalization with Binary Coding", IEEE International Conference on Communications, ICC '2000, New Orleans, pp. 1-5, vol. 1.

Hoeher, Peter, "Advances in Soft-Output Decoding", IEEE Global Telecommunications Conference, Nov.-Dec. 1993, pp. 793-797.

Stiglmayr, Stephan, et al., "Adaptive Coding and Modulation in OFDM Systems using BICM and Rate-Compatible Punctured Codes", 7 pages.

G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, Md, USA, Mar. 2005.

Yiu, S., et al., "Distritbuted Space-Time Block Coding for Cooperative Networks With Multiple Antenna Nodes", Computational Advances in Multi-Sensor Adaptive Processing, Dec. 13, 2005, pp. 52-55.

Yiu, Simon, et al., "Optimization of Distributed Space-Time Filtering", IEEE 62nd Vehicular Technology Conference, Sep. 2005, pp. 1829-1833, Piscataway, New Jersey, USA.

Adachi, Koichi, et al., "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.

Detert, Thorben, "An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jersey, USA.

Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.

Sun, Sumei, et al., "Pseudo-Inverse MMSE Based QRD-M Algorithm for MIMO OFDM", Jan. 1, 2006, pp. 1545-1549, vol. 3.

Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.

* cited by examiner

$$\begin{bmatrix} z(1) \\ z(2) \end{bmatrix} = \begin{bmatrix} z_1(1) \\ z_2(2) \\ z_3(3) \\ z_4(4) \end{bmatrix} = \begin{bmatrix} k_1 & k_1 w_{12} & 0 & 0 \\ 0 & 0 & k_2 & k_2 w_{24} \\ k_1 w_{12} & -k_1 & 0 & 0 \\ 0 & 0 & k_2 w_{24} & -k_2 \end{bmatrix}_{W} \begin{bmatrix} s_1 \\ s_2 \\ s_3 \\ s_4 \end{bmatrix}$$

Time $$\mathbf{B} = \begin{matrix} 1 \cdots t \\ t+1 \cdots 2t \\ \vdots \\ (L-1)t+1 \cdots Lt \end{matrix} \begin{bmatrix} B(z(1)) & 0 & \cdots & 0 \\ 0 & B(z(2)) & \ddots & \vdots \\ \vdots & \ddots & \ddots & 0 \\ 0 & \cdots & 0 & B(z(L)) \end{bmatrix}$$

$$\cdots \qquad \cdots \qquad \cdots$$

$$1 \cdots n \quad n+1 \cdots 2n \quad (L-1)n+1 \cdots Ln \quad \text{Base station}$$

Precoding $$\begin{bmatrix} z(1) \\ z(2) \\ \vdots \\ z(L) \end{bmatrix} = \underbrace{W}_{\text{precoder of } s} \begin{bmatrix} s_1 \\ s_2 \\ \vdots \\ s_{Lk} \end{bmatrix} + \underbrace{V}_{\text{precoder of } s^*} \begin{bmatrix} s_1^* \\ s_2^* \\ \vdots \\ s^*_{Lk} \end{bmatrix}$$

METHOD AND APPARATUS FOR DISTRIBUTED SPACE-TIME CODING IN WIRELESS RADIO NETWORKS

PRIORITY

The present patent application claims priority to and incorporates by reference the corresponding patent application Ser. No. 11/754,903, entitled, "A Method and Apparatus for Distributed Space-Time Coding for the Downlink of Wireless Radio Networks", filed on May 29, 2007, which claims priority to and incorporates by reference corresponding provisional patent application Ser. No. 60/810,457, entitled, "A Method and Apparatus for Distributed Space-Time Coding for the Downlink of Wireless Radio Networks", filed on Jun. 1, 2006.

FIELD OF THE INVENTION

The present invention relates to the field of space-time coding; more particularly, the present invention relates to distributed space-time coding for downlink communications in a wireless radio network.

BACKGROUND OF THE INVENTION

The problem of interest arises in settings involving the downlink of cellular systems whereby the information sequence is available at multiple base stations. The invention exploits intelligent transmission of the information bearing signal over the multiple independently fading paths from each transmitting base station to the receiver to provide diversity and thus coverage/reliability benefits to the receiver. One embodiment of the invention draws upon connections between the given setting, where data are available at multiple base stations, and settings involving a single active base station with multiple transmit antennas. In particular, it builds upon the existing body of work on the use space-time block codes (STBCs) for providing diversity in the downlink in the case that a single base station with multiple transmit antennas is employed for transmission.

A large collection of STBCs have been proposed in recent years as a way of providing diversity and/or multiplexing benefits by exploiting multiple transmit antennas in the forward link of cellular systems. Given the presence of N transmit antennas, the typical objective is to design the STBC so as to provide order-N diversity in the system. Typical STBC designs encode blocks of K symbols that are transmitted over each of the N antennas by T samples, where T is greater than or equal N, as well as K. Such STBC designs are described by a T×N STBC matrix, whose (i,j)th entry denotes the sample transmitted by the j-th antenna at time i. Of interest are full-rate schemes, i.e., schemes where the effective data transmission rate R=K/T equals 1 symbol/channel use. Another important attribute of a STBC is its decoding complexity. Although the complexity of arbitrary STBCs is exponential in the size K" of the jointly encoded symbols, there exist designs with much lower complexity. One such attractive class of designs, referred to as orthogonal space-time codes, can provide full diversity while their optimal decoding decouples to (linear processing followed by) symbol-by-symbol decoding.

In S. Yiu, R. Schober and L. Lampe, "Distributed Block Source Coding," *IEEE GLOBECOM* 2005 *Proceedings*, November 2005, a distributed space-time coding method is presented for providing diversity benefits in the setting of interest. The method exploits a standard order-N diversity STBC together with a base station specific "postcoding" operation.

Orthogonal space-time block code designs are well-known in the art and have the following features: they provide full (order-N) diversity; they allow symbol-by-symbol decoding; and their (column) shortened versions are also orthogonal designs, thus providing such orthogonal designs for system with any number of antennas less than or equal to N.

Despite the obvious advantages of orthogonal STBC designs in a distributed downlink transmission environment, a key shortcoming with this approach stems from its limited applicability, in the form of the limitations it incurs in the transmission parameters. In particular, no (complex) full-rate orthogonal designs exist for more than two antennas. For more information, see H. Jafarkani, *Space-Time Coding, Theory and Practice*, Cambridge University Press, 2005. Specifically, the maximum transmission rate with an OSTBC for an N>3 transmit-antenna setting is provably upper-bounded by ¾ (H. Wang and X.-G. Xia, "Upper bounds of rates of space-time block codes from complex orthogonal designs," *IEEE Trans. Information Theory*, pp. 2788-2796, October 2003). Furthermore, although ¾ rate orthogonal space-time codes have been found for N=3 and N=4 transmit antennas, it is not known whether or not the ¾ rate is achievable for N>4 with the restriction of orthogonal designs. In fact, the highest known rate achievable by systematic (complex) orthogonal STBC designs is ½. Such designs make an inefficient use of bandwidth as they employ only half of the available dimensions in the signal space for transmission.

Quasi-orthogonal space-time block code designs exploit the existence of an orthogonal design for an N transmit-antenna system to provide full-rate designs for a 2 N antenna system. Some designs employ the base (N=2) full rate orthogonal design, referred to as the "Alamouti" scheme, to obtain a full diversity system for N=4, that allows for hierarchical decoding. For more information, see S. M. Alamouti, "A simple transmitter diversity scheme for wireless communications," *IEEE Journal Selected Areas in Communications*, pp. 1451-1458, October 1998. For instance, one design encodes two blocks of two symbols at a time over four time slots, where the four transmit antennas are split into two groups/pairs and each of the given two pairs of symbols are used independently to construct two Alamouti (N=2) space-time codes. In the first two time slots, each of the two antenna groups signals one of the two "Alamouti" codes and swap for the next two slots. Provided the second set of symbols is from a properly rotated constellation, these designs achieve full diversity and hierarchical decoding.

The use of distributed space-time block codes based on postcoders was introduced in S. Yiu, R. Schober and L. Lampe, "Distributed Block Source Coding," *IEEE GLOBECOM* 2005 *Proceedings*, November 2005. In their technique, each active base station exploits the same space-time block for signaling. In particular, given a T×N space-time block code designed to send blocks of K symbols over n antennae at rate K/T, and given a symbol sequence that is to be transmitted, each base station generates first the common code T×N STBC matrix as if there were a single "active" base station with N transmit antennas. The signal transmitted by the single antenna of an "active" base station is then a linear combination of the columns of the T×N STBC matrix. This linear combination is specific to the particular antenna at the particular base station and can be conveniently expressed as a "projection" of the common STBC onto a base-station specific "steering" vector. Given a set of $M_{max}$ single-antenna base-stations, each of which can be potentially "active", the set of $M_{max}$ steering vectors can be jointly optimized a priori, e.g., by use of an LMS algorithm. The resulting set of optimized steering vectors allows the following: given any M out of $M_{max}$ base stations are "active" (regardless of which "M" are "active"), with M greater or equal to N, the distributed scheme provides order-N diversity, i.e., the full diversity of the original STBC code. Furthermore, via the joint optimization of the steering vectors the worst-case loss in coding-gain-distance performance with respect to the standard STBC can be minimized.

Although the above approach has a number of advantages, it also has two main drawbacks. First, the larger the set of potentially active steering vectors, the higher the performance loss with respect to the standard code performance. Hence, there is a need for approaches that are scalable, i.e., approaches that scale well with changing M. The joint optimization of the set of potentially active steering vectors proposed in S. Yiu, R. Schober and L. Lampe, "Distributed Block Source Coding," *IEEE GLOBECOM* 2005 *Proceedings*, November 2005, is not scalable. Second and more important, the diversity benefits of the approach are limited by the strength of the standard STBC code employed in the design. Thus, if the well known "Alamouti" code, is employed (designed for a two antenna system), the system provides diversity of order at most 2 even if M, the number of "active" cooperating transmit antennas may be much larger than 2.

SUMMARY OF THE INVENTION

A method and apparatus is disclosed herein for performing distributed space-time coding. In one embodiment, the distributed space-time coding is used for downlink communications in wireless radio networks. In one embodiment, the method comprises storing an information-bearing sequence at two or more base stations in a group of base stations; and transmitting data corresponding to the information-bearing sequence from a number of base stations for receipt by a receiver of a user, where the number of base stations is not globally known a priori and indicates a diversity of order, such that the diversity of order M is obtained if a total of M number of antennas spread over multiple base stations transmit the information-bearing sequence, where M is an integer.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A number of recently developed techniques and emerging standards suggest employing multiple antennas at a base station to improve the reliability of data communication over wireless media without compromising the effective data rate of the wireless systems. Specifically, recent advances in wireless communications have demonstrated that the presence of multiple antennae at a base station can be exploited to provide reliability (diversity) benefits as well as throughout benefits in data transmission from the base station to cellular users. These multiplexing and diversity benefits are inherently dependent on the number of transmit and receive antennas in the system been deployed, as they are fundamentally limited by the multiplexing-diversity trade-offs curves.

In many emerging and future radio networks, the data for any particular cell user may be available to multiple base stations. Any such base station with data for the user of interest is referred to herein as an "active" base station. By using space-time coding techniques over the antennas of the active base stations, each of the active base station antennas may be viewed, for a particular user, as an element of a virtual antenna array, which can be used to provide diversity benefits to the desired user. In one embodiment, the number and set of active base stations vary with time, due to the time-varying quality of wireless channels relaying the data to the base-stations, or the serving demands of the individual stations. Furthermore, the active base stations at any time may not be globally known a priori. To compensate for this, space-time coding techniques are used to provide diversity benefits regardless of which set of base stations are active at any time.

In one embodiment, a technique is used to provide uniformly optimized performance at the receiver, regardless of the particular set of active base stations. The technique includes the use of a common data precoder at each potentially active base station, followed by a common (to all base stations) standard space-time block code (STBC). A postcoding operation then follows the STBC. In one embodiment, this postcoding operation generates the signal to be transmitted by projecting the output of the STBC operation on a steering vector, which is distinct for each base station (and for each antenna at each base station, in case there are multiple antennas at given base station). The technique is distributed in the sense that the transmitter/encoder employed at each base station is the same, regardless of which other base stations are active. In addition, in one embodiment, the receiver does not need to have knowledge of the set of active base stations.

As will be evident from the discussion below, advantages of the techniques described herein include, but are not limited to, improving bit-error rates or improved coverage or throughput when more than one base station is active (in comparison to a baseline system exploiting a single base station for data transmission in the forward link) and providing maximum diversity available in the set of active base stations given an arbitrary set of active transmitting base stations. In one embodiment, this additional (and full) diversity benefit is guaranteed by encoding several space-time coding blocks at a time (at the cost of delay), and using the common precoder described herein at each potentially active base station. Furthermore, in one embodiment, the coding gain benefits of these full diversity systems are optimized using the post-coders employed at all the potentially active base stations.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

One embodiment of the present invention allows transmission of common information via a set of potentially active transmitting base stations to a receiver. It allows reliable transmission regardless of which set of base stations is transmitting, i.e., is potentially "active". In one embodiment, a method uses a given t×n space-time block code that encodes k symbols at a time, to generate, at each active base station, a larger code with a processing delay T=L-times-t, where the larger code encodes K=L-times-k symbols at a time. In one embodiment, this distributed encoding scheme provides the full diversity available in the set of "active" base stations provided the number of active base stations is at most N=L times n.

As set forth above, an embodiment of the present invention includes a common (to all base stations) linear precoder in combination with common (to all base stations) standard baseline space-time block code (STBC) and a set of base-station- and antenna-specific post-coding/steering vectors for distributed communication over nonselective fading channels. In one embodiment, the linear precoder, an embodiment of a method for combining L elementary t×n STBC blocks into a T×N STBC, and a set of steering vectors for providing the maximum possible diversity for any set of active base stations are configured jointly so that maximum available diversity is achievable for any given set of active base stations. In one embodiment, the linear precoder, an embodiment of a method for combining L elementary t×n STBC blocks into a T×N STBC, and a set of steering vectors for providing the maximum possible diversity for any set of active base stations are configured jointly to provide full diversity, good coding gains and hierarchical decoding.

Communication System and Transceiver Design

In one embodiment, a transceiver is designed for distributed communication of a symbol stream from multiple base stations to a receiver in a communication system. Each active base station has a common information-bearing symbol stream $s_i$ available that is to be communicated to the receiver. In one embodiment, each "active" base station has no prior information about which of the other base stations are active. The information-bearing symbol stream is partitioned into contiguous blocks of K consecutive symbols. A generic block symbol of dimension K is labeled herein as "s". Each such block symbol is communicated by each active antenna via a signal with duration equal to T time slots.

Figure 1A:
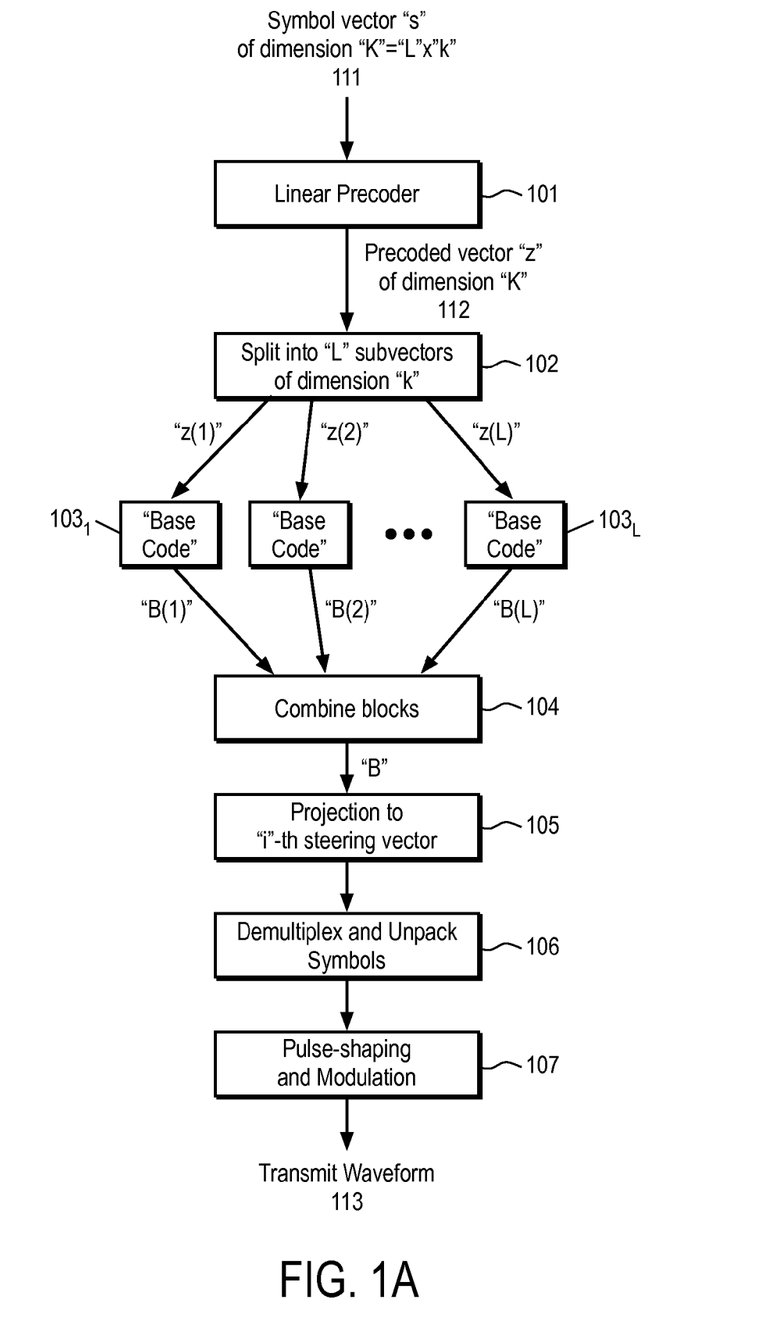
FIG. 1A is an example of a wireless communication system.

FIG. 1A is a block diagram of a wireless communication system. Referring to FIG. 1A, the wireless communication system comprises multiple base stations 101 and one or more wireless communication devices 102 (e.g., mobile phones, handsets, computers, etc.). An information-bearing sequence that is to be sent to a wireless communication device from two or more base stations 101 in a group of base stations is stored in those base stations and transmitted by those base stations for receipt by a receiver of wireless communication device. The number of base stations that transmit the information-bearing sequence is not globally known a priori and sets the diversity of order. In this context, the term "globally" means that in general the number and the identity of the base stations and their antennas that are actively cooperating in transmitting data to a particular user is not known to the participating base-stations. For instance, if each base station has a single antenna the diversity of order M (e.g., 4) is obtained if M base stations (e.g., 4) transmit data corresponding to the information-bearing sequence, where M is an integer. In general, the diversity order M is obtained if a total of M antennas (spread over multiple base stations) transmit data corresponding to the information-bearing sequence, where M is an integer.

At each of the base stations transmitting data corresponding to the information-bearing sequence, a pre-processing module 111 pre-processes the information-bearing sequence using pre-coding that is common to all base stations transmitting data corresponding to the information-bearing sequence to produce precoded data, a space-time block code module 112 encodes the precoded data using a space time block coding scheme common to all base stations in the number of base stations; and a post processing module 113 performs base station- and antenna-specific post-processing of data generated as a result of encoding the precoded data.

In one embodiment, pre-processing module 111 receives a vector s of K=L k symbols and precodes the symbol vector s. In one embodiment, pre-processing module 111 pre-processes the information-bearing sequence by linearly precoding disjoint sub-blocks of symbol vectors into a set of precoded subvectors and creating sub-blocks from the precoded data. In one embodiment, the sub-blocks are created by re-interleaving elements of the precoded vectors into a new set of vectors. Note that sub-block creation may be performed by another module. In yet another embodiment, pre-processing module 111 precodes k symbol sub-vectors of size L in a manner that allows hierarchical decoding. In yet another embodiment, pre-processing module 111 generates L precoded symbols of size k from the k precoded sub-vectors of size L.

In one embodiment, space-time block code module 112 encodes the precoded data by generating an STBC matrix. In one embodiment, space-time block code module 112 also combines elementary precoded STBC blocks into a larger STBC matrix.

In one embodiment, post-processing module 113 performs base station-specific post-processing of data generated as a result of encoding the precoded data. In one embodiment, post-processing module 113 uses a set of post-coding steering vectors and performs the post-processing by projecting a STBC matrix on an individual steering vector that is specific to each base station in the base stations transmitting the information-bearing sequence.

The base station also includes a module (not shown) that unpacks the necessary information from blocks into the sample stream and a module to generate one or more waveforms that are transmitted by the transmit antennas of the "active" base stations.

Figure 1B:
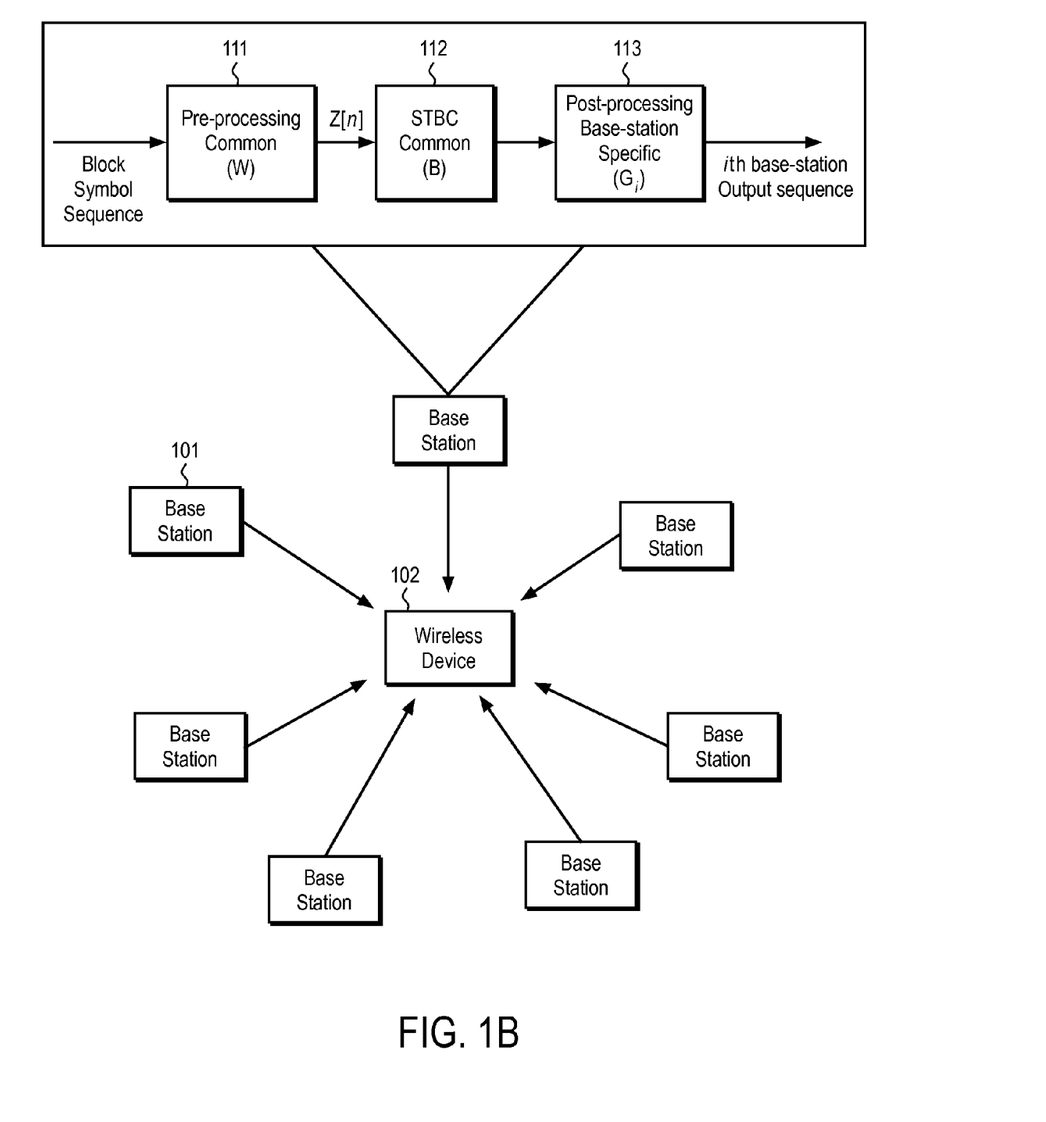
FIG. 1B is a block diagram of one embodiment of a basic encoding scheme.

FIG. 1B is a more detailed block diagram of one embodiment of an encoding/transmission process at the i-th base station (if the base station has multiple antennas, "i" denotes the index of a specific antenna at a specific active base station). The encoding/transmission process is performed by processing logic that may comprise hardware (circuitry, dedicated logic, etc.), software (such as is run on a general purpose computer system or a dedicated machine), or a combination of both. In one embodiment, the encoding/transmission process relies on the use of a full-diversity "n" transmit-antenna orthogonal space-time block code (referred to as "baseline code" in FIG. 1B) designed for encoding/communicating blocks of k symbols over t time slots. Given a blocking factor (L), the encoding/transmission process generates a (full diversity) space-time block code ("induced code") that can encode via an L×n (N) transmit-antenna system blocks of symbols of size L×k (K) over L×t (T) time slots.

Referring to FIG. 1B, in one embodiment, the encoding operations of the encoding/transmission process at the i-th base station are as follows. A linear precoder 101 receives an input 111 consisting of a symbol vector s of size K. Symbol vector 111 represents the information to be transmitted and is assumed to be generated at earlier stages. In a pilot (channel estimation) phase, the vector s employed is assumed to be known at the receiver. In the data transmission phase, the vector s represents a set of K symbols to be transmitted to the receiver and is thus unknown to the receiver.

In one embodiment, linear precoder 101 precodes the symbol vector s through a linear transformation into a K×1 precoded vector z (112). The vector z is generated by (linearly) projecting s onto a K×K precoding matrix (W).

A partitioning module 102 partitions the K×1 vector z into L blocks of size k (shown as $z(1), z(2), \ldots, z(L)$ in FIG. 1). Each of the precoded blocks $z(1), z(2), \ldots, z(L)$ of size k is encoded via the base code $103_{1-L}$, respectively, to generate L matrices of dimension t×n, (shown as $B(1), B(2), \ldots, B(L)$ in FIG. 1).

A combining module 104 combines the base code blocks $B(1), B(2), \ldots, B(L)$ and uses the all-zeros t×n matrix as block constituents to generate an L×L block matrix, i.e., the induced code (referred to as B in FIG. 1B). The matrix B has dimensions T×N (T=L×t, N=L×n). In its simplest non-degenerate form, matrix B is a block diagonal matrix, whereby the i-th t×n block equals B(i).

A projection module 105 of the i-th base station (or the ith active antenna in case multi-antenna base stations are employed) operates as a post processing module and projects matrix B on its own steering vector of size N×1 to generate the effective transmitted sample vector (referred to as x(i) in FIG. 1B).

A demultiplex and symbol unpacking module 106 of the i-th base station converts its sequence of effective transmit sample vectors x(i) into a sequence of scalar samples in a manner well-known in the art. A pulse-shaping and modulation module 107 receive these samples and perform pulse shaping and modulation to create, in a manner well-known in the art, the information sequence that is represented as transmit waveform 113, which is to be transmitted over the antenna of the i-th base station.

Thus, in one embodiment, techniques described herein improve the performance of existing distributed space time coding schemes by joint precoding of blocks of symbols prior to STBC, followed by postcoding, in an effort to increase the maximum diversity available by the original STBC. The method encodes data in blocks larger than the memory of the code, thereby increasing the dimensionality of the signal space, and allowing diversity benefits that exceed those of the standard STBC or other prior art schemes. To achieve the full diversity available with a given set of "active" base stations, blocks of data symbols are precoded prior to STBC encoding. In one embodiment, the precoder allows achieving full diversity, while allowing for low-complexity optimal decoding (though not required). In one embodiment, the technique is directly compatible with prior art postcoding techniques. Furthermore, given M active base stations, the technique provides diversity of order M regardless of which set of M base-stations are "active", and allows for joint optimization of the postcoder with the precoder and the STBC modules for also alleviating the worst-case coding gains over all subsets of M-"active" base stations.

Figure 2:
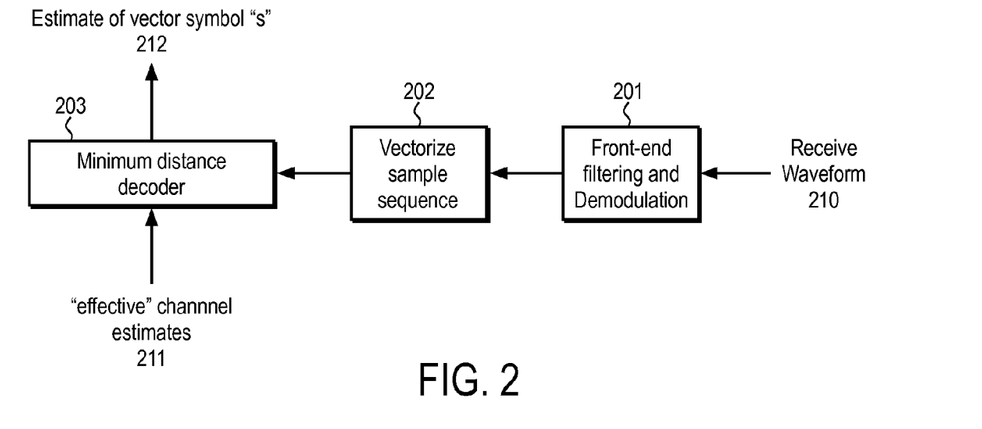
FIG. 2 is a block diagram of one embodiment of a basic decoding scheme.
Figure 3:
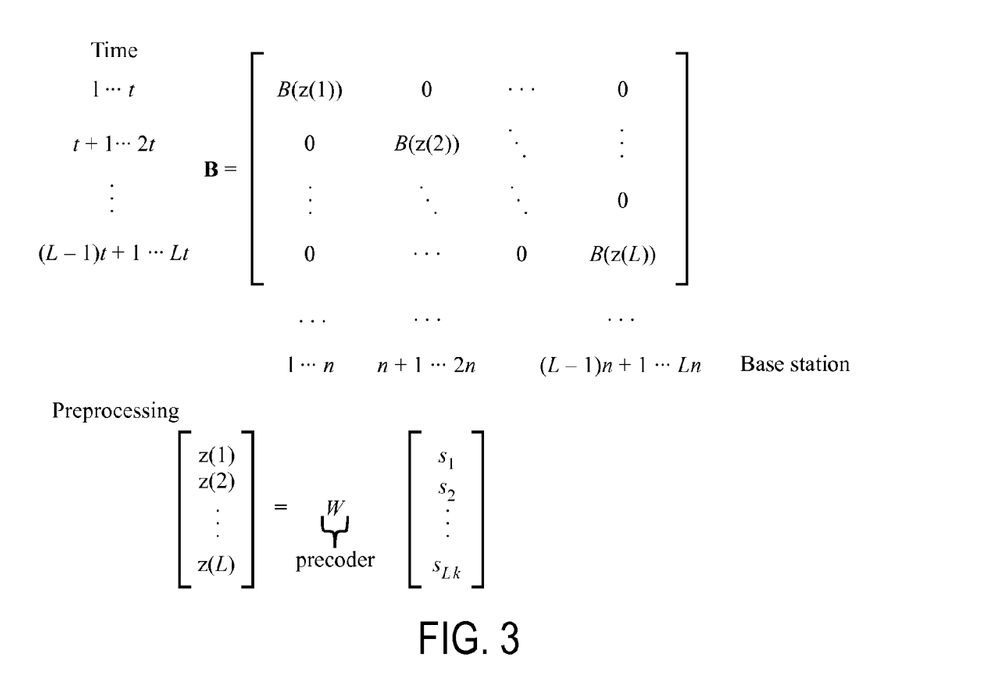
FIG. 3 illustrates one embodiment of a precoded block-diagonal STBC encoder.

FIG. 2 is a generic block diagram of one embodiment of a receiver. The receiver may be a portion of wireless device 102 in FIG. 1A. The receiver receives waveforms from multiple based stations in the communication system that are transmitting data corresponding to the information-bearing sequence. The number of base stations is not globally known a priori and indicates a diversity of order, such that the diversity of order M is obtained if a total of M number of antennas (spread over multiple base stations) transmit the information-bearing sequence, where M is an integer.

At the receiver, the transmissions (constructively) overlap with each other, and the receiver observes the aggregate effect. The receiver does not need to specifically know which of the additional base-stations are assisting in the transmission. The receiver structure is the same whether there is one or more transmitting base stations. Note that in the channel estimation phase, the channel estimates obtained at the receiver are the "effective" channel estimates summarizing the aggregate channel effect through the joint transmission.

Referring to FIG. 2, during a channel estimation phase, the receiver estimates channel coefficients 211 via a straightforward application of a standard pilot-assisted method for STBCs that is well-known in the art.

In the data detection phase, front-end filtering and demodulation module 201 receives, as an input, receive waveform 210 and performs filtering and demodulation to create a complex-valued received signal sequence. A vectorization module 202 converts the received signal sequence into a sequence of T-dimensional vectors. In one embodiment, given a received T-dimensional vector and a channel estimate vector 211, minimum distance decoder 203 finds the induced code, which, when passed through the channel with a given channel estimate vector is the closest in Euclidean distance to the received T dimensional vector. In many cases of practical interest, the complexity of this detection can be greatly reduced, such as when the induced code has block-diagonal form.

The effective channel response seen at the receiver captures (indirectly) the number of participating base stations and their individual postcoding vectors in the form of "aggregate" effective channel coefficients. These are estimated in the channel estimation phase; the same pilot (known to the receiver) symbols are sent by all base-stations, and the received signal is used to estimate these "aggregate-effect" channel coefficients. The minimum distance decoder in FIG. 2 (module 203) also incorporates the effect of the linear precoder in its distance metric calculations.

DETAILED DESCRIPTION OF VARIOUS EMBODIMENTS

There are many possible transcoder design options that can affect the performance of the encoding and/or decoding systems described herein. For example, the choice of the precoder employed in conjunction with a given baseline code and a given blocking factor L has an impact on the diversity and coding gain distance properties of the induced code as well as the decoder complexity. One embodiment of a precoder is described below.

Precoder-Postcoder Embodiments

In one embodiment, the function of the precoder is to reshape the error constellations of the induced code (which is an L-fold extension of the underlying baseline code), thereby improving the diversity/coding gain profile of the induced code. In one embodiment, these performance metrics are improved by implementing a precoder with the following characteristics.

First, the baseline code used is the well-known Alamouti code (S. M. Alamouti, "A Simple Transmitter Diversity Scheme for Wireless Communications," *IEEE Journal Selected Areas in Communications*, pp. 1451-1458, October 1998, incorporated herein by reference). The Alamouti code is an orthogonal STBC designed for n=2 transmit antennas, and codes k=2 symbols over t=2 time slots, where the blocking factor is selected as L=2. Thus, using this code, 4 symbols are encoded at a time ($s_1$, $s_2$, $s_3$, and $s_4$) over 4 time slots and 4 antennas. The induced code B is selected as a block-diagonal matrix with the two diagonal blocks selected as the two base-codes B(1) and B(2) generated by the precoding vectors z(1) and z(2).

Figure 4:
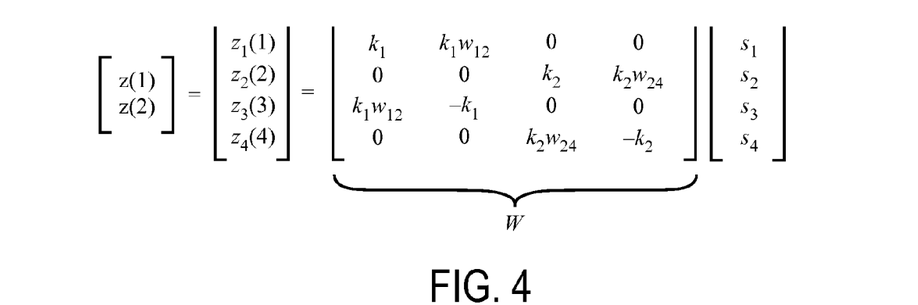
FIG. 4 illustrates one embodiment of a precoder structure allowing hierarchical decoding with the Alamouti code as a baseline.

Second, assuming no precoding is used (i.e., W is the identity matrix in FIG. 4), the system provides diversity of order 2. In particular, diversity equals the smallest count, among all possible error events, of the eigenvalues of the code-error matrix that are different from zero. In the example, there are 4 eigenvalues (referred to herein as $\lambda(m)$, for m=1, 2, 3, 4). Due to the assumed block diagonal structure of B, both $\lambda(1)$ and $\lambda(2)$, equal $$|e_1(1)|^2 + |e_2(1)|^2,$$

where $e_1(1)$ and $e_2(1)$ are the error events on the first and second entry of z(1) (corresponding in this case to the error events in $s_1$ and $s_2$, respectively). Similarly, both $\lambda(3)$ and $\lambda(4)$, equal $$|e_1(2)|^2 + |e_2(2)|^2,$$

where $e_1(2)$ and $e_2(2)$ are the error events on the first and second entry of z(2) (corresponding in this case to the error events in $s_3$, $s_4$, respectively). The order-2 diversity in this case arises from the fact that there are nonzero error events that make two of the eigenvalues equal to zero (e.g. error events where there is no error in $s_1$ and $s_2$, but there is in at least one of $s_3$, $s_4$, or vice-versa).

Figure 5:
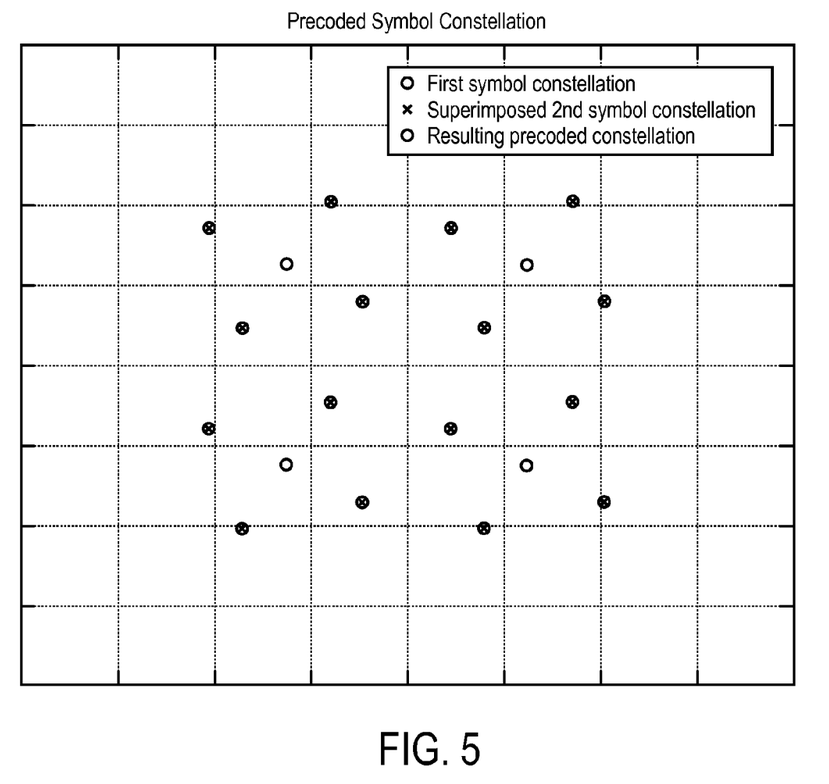
FIG. 5 illustrates a constellation of a typical precoded symbol.

Third, by properly precoding linear combinations of the original symbols in each of the entries of z, diversity of order-4 can be guaranteed with very good coding gains. One such design is shown in FIG. 4. In this design, the first element of z(1) and z(2) are encoded as a linear combination of the first two symbols $s_1$ and $s_2$, while their second element are a linear combination of $s_3$ and $s_4$. The complex scaling constant properly are selected so that the error constellations of $e_1(1)$, $e_2(1)$, $e_1(2)$ and $e_2(2)$ can be pre-shaped, so that any nonzero error pattern in the original set s results in all four eigenvalues of the code-error matrix to be nonzero, thereby guaranteeing diversity of order 4. The resulting constellations of the elements of z are shown in FIG. 5, for the case that each symbol $s_m$ is from a QPSK constellation, and resemble superposition codes.

Fourth, if the antennas in the four-antenna system represent single-antenna elements at four distinct base stations, and if M (single-antenna) base stations out of 4 of these base stations are active, the proposed design guarantees full-rate transmission and diversity of order M, which is advantageous.

Note that by restricting the precoder to be of the form of FIG. 4, precoded symbols are formed as linear combinations of only 2 symbols at a time, which is suboptimal. Brute force optimization of the precoder in this case shows that the restrictions of the design in FIG. 4 yield a negligibly small cost in coding gain. More important, the precoder form of FIG. 4 allows for hierarchical decoding (decoding 2 symbols at a time at the receiver).

Thus, as described above, linear precoding of K dimensional symbol (i.e., a total of L×k-dimensional symbols) is performed, through an appropriately designed linear precoder to produce L×k-dimensional precoded symbol vectors, where each of these L vectors is encoded with the baseline code to generate a t×n STBC matrix. In the simplest form of the method, the T slots are split over L contiguous sets of t slots, and over each t slot interval one of the codes is transmitted from one of L size-N set of potentially active base stations.

Furthermore, the techniques described herein allow for systematically extending the original orthogonal STBC designs to obtain communications systems where the total number of antennas is more than twice the number of antennas in the originally employed space-time code.

Precoding and Hierarchical Decoding

Figure 7:
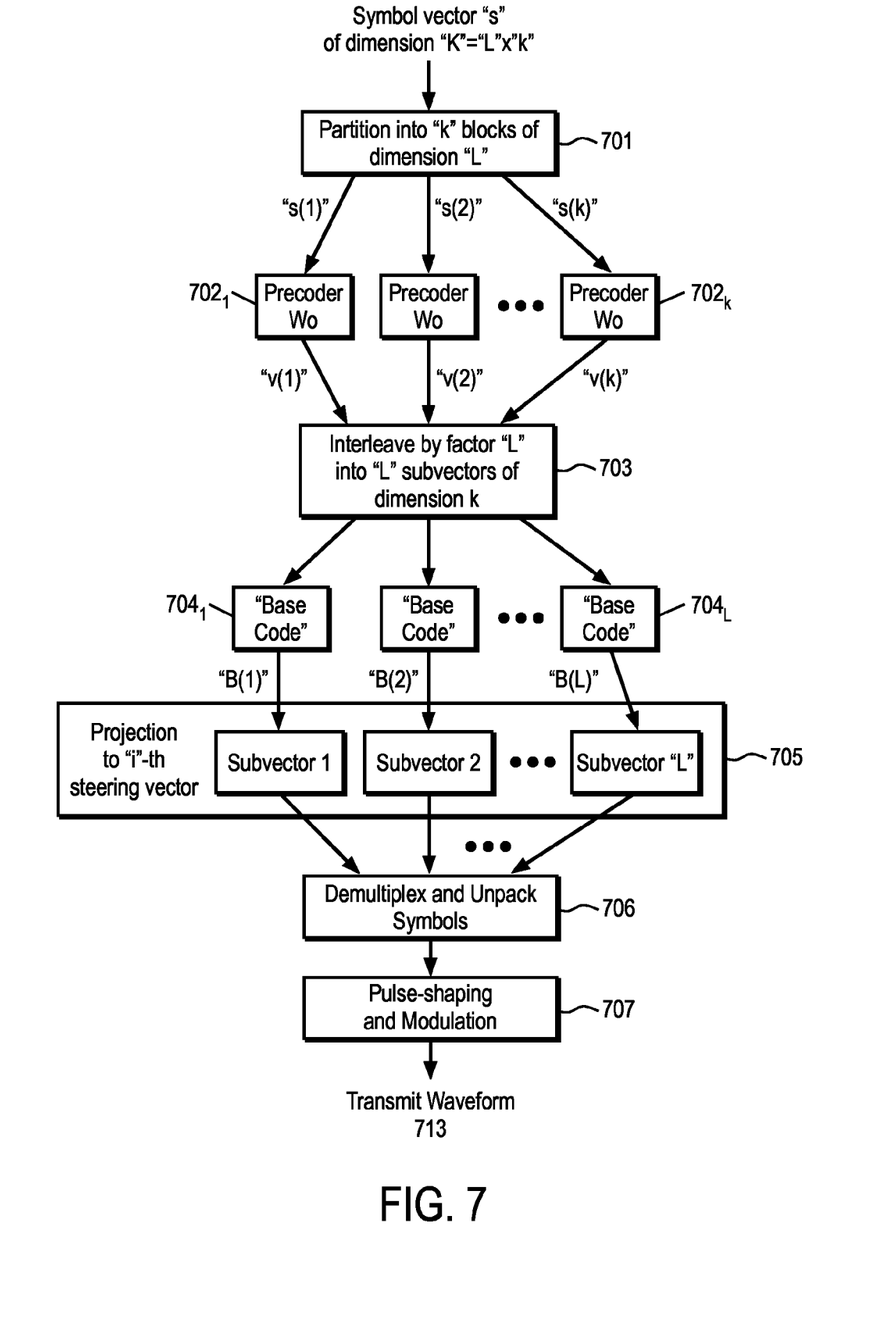
FIG. 7 is a block diagram of one embodiment of an encoder that allows for hierarchical decoding.

Pre-shaping the error constellation through linear precoding naturally extends to the more general setting involving L factors greater than 2, as well as t, k, and n dimensions exceeding 2. In one embodiment, a systematic precoding approach for obtaining full diversity transmission regardless of the set of active base-stations, in the case that the base code satisfies $k \leq t$, while allowing for hierarchical decoding. FIG. 7 is a block diagram of one embodiment of an encoder that illustrates such an approach. The operations of FIG. 7 are performed by processing logic that may comprise hardware (circuitry, dedicated logic, etc.), software (such as is run on a general purpose computer system or a dedicated machine), or a combination of both.

Referring to FIG. 7, a partition module 701 receives a symbol vector s of dimension $K = L \times k$ and split s into k symbol sub-vectors of size L (shown as s(1), s(2), ..., s(k)). A set of precoders 702$_{1-k}$ precodes each sub-vector via the same linear $L \times L$ precoder Wo to obtain k precoded symbols of dimension $L \times 1$, referred to as v(1), v(2), ..., v(k). An interleave module 703 constructs the L $k \times 1$ precoded symbols z(1), z(2), ..., z(L). In one embodiment, interleave module 703 operates as follows: the entries of z(1) are the first elements of v(1), v(2), ..., v(k); the entries of z(2) are the second elements of v(1), v(2), ..., v(k); the construction continues in the same fashion until the entries of z(L) are set as the last elements of v(1), v(2), ..., v(k).

An encoder 704 encodes each of the precoded blocks z(1), z(2), ..., z(L) of size k via the base code 704$_{1-L}$ respectively, to generate L matrices of dimension $t \times n$ (shown as B(1), B(2), ..., B(L) in FIG. 7, which is a block-diagonal B).

A projection module 705 of the i-th base station projects matrix B on its own steering vector of size $N \times 1$ to generate the effective transmitted sample vector. More specifically, each of baseline codes B(1), B(2), ..., B(L) are projected onto a separate subvector of the i-th steering vector.

A demultiplex and symbol unpacking module 706 of the i-th base station converts its sequence of effective transmit sample vectors x(i) into a sequence of scalar samples. A pulse-shaping and modulation module 707 receive these samples and perform pulse shaping and modulation to create the information sequence that is represented as transmit waveform 713, which is to be transmitted over the antenna of the i-th base station.

Also as described above, techniques described herein rely on an STBC designed to encoded k symbols at a time over t time slots and n antennas. In this case, each base station encodes L blocks of k symbols at a time, incurring a delay of $L \times T$ slots. Prior to forming the STBC, the data symbols are precoded by using a linear transformation. The effect of the linear transformation is to spread each symbol over the L coding blocks and allow a diversity order of up to $L \times n$, even though the standard STBC can only provide diversity of order n on its own. In one embodiment, time-varying steering vectors are also used for further optimizing the coding gains of the overall system.

Performance Enhancements

Figure 6:
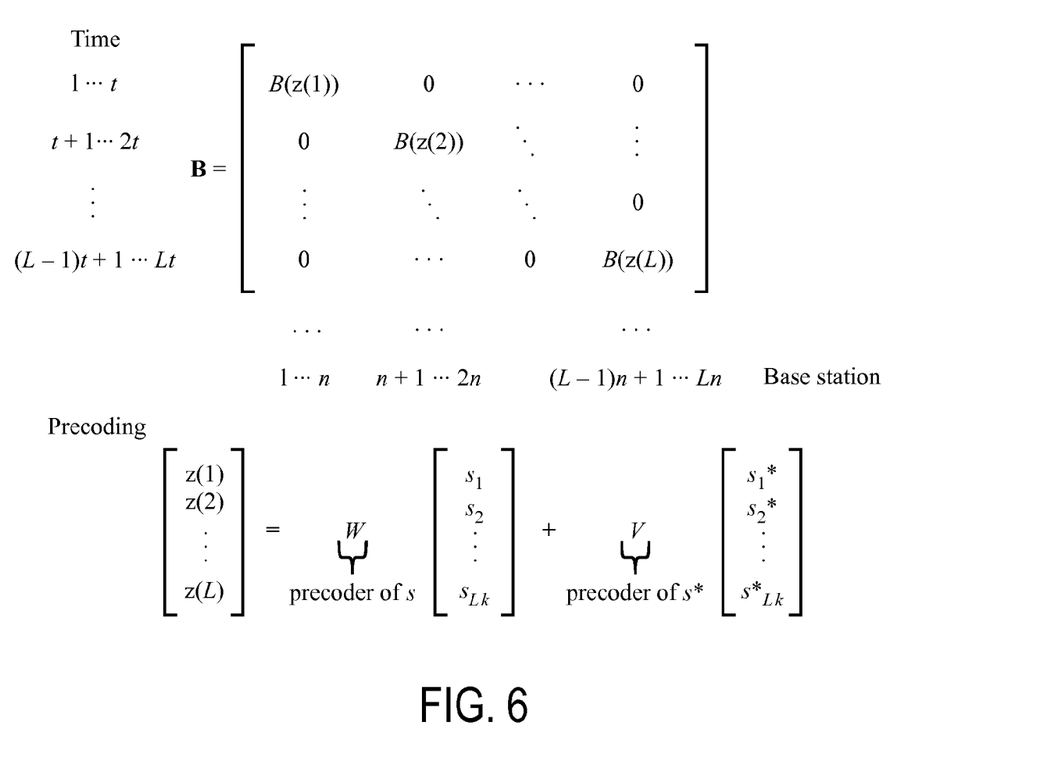
FIG. 6 illustrates linear precoding of the symbol vector s and its conjugate with block-diagonal combining.

There is at least two more performance enhancements that may be used. First, the use of a linear precoder operating on the both the complex symbol vector and its conjugate. Such a precoder structure is shown in FIG. 6, where both W and V are in the form amenable to the implementation in FIG. 7 (where each of the v(m) vectors is constructed as the sum of precoding s(m) via Wo and its conjugate via an $L \times L$ precoding matrix Vo associated with V). This enhancement provides more freedom in designing the precoder system, and can yield improvements in the coding gain distance of the induced code, while still being amenable to hierarchical decoding. Second, the block diagonal structure of the combining of the individual blocks can be replaced in many cases (such as the design in FIG. 4) by one where all the blocks in the m-th block column of B are equal to B(m). This construction has better peak-to-average power ratio than the block diagonal ones, and can still allow hierarchical decoding.

Examples of Advantages of Embodiments of Invention

There are a number of advantages associated with embodiments described herein. First, embodiments described herein allow opportunistic diversity/reliability improvements in wireless communication of data to a receiver, by exploiting the availability of the same data and signaling resources at other active base stations. This reliability improvement comes at no cost in total transmit power per symbol, data rate, or bandwidth. Second, given an arbitrary set of active base stations, techniques can provide full diversity benefits regardless of which set of the base stations are in the active set. Third, the proposed technique is distributed, i.e., the encoding at any active base station is performed without knowledge of which of the other base stations are active. Fourth, certain embodiments of the disclosed method allow low-complexity decoding at the receiver. Lastly, in one embodiment, the average received signal SNR can be taken into account to accommodate the fact that distinct active base stations can be at different distances from the receiver, and thus the average received signal strengths differ.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method for sending an information-bearing sequence to a receiver through cooperation of an arbitrary set of base stations, the method comprising a series of operations performed at each base station in the arbitrary set of base stations, the series of operations comprising:
   dividing data into blocks; and
   sequentially and independently encoding the blocks by
      precoding each data block to produce precoded data using a precoder that is common to base stations in the arbitrary set of base stations, wherein precoding each data block to produce precoded data comprises linearly precoding disjoint sub-blocks of symbol vectors into a set of precoded subvectors,
      creating sub-blocks from the precoded data, wherein creating sub-blocks from the precoded data comprises re-interleaving elements of the precoded vectors into a new set of vectors, encoding the sub-blocks independently using a space-time block code (STBC) that is common to base stations in the arbitrary set of base stations to generate an STBC matrix, and performing base station-specific and antenna-specific post-coding by projecting the STBC matrix on an individual steering vector that is specific to said each base station.

2. The method defined in claim 1 wherein the precoder, the STBC and the post coding, in combination, provide full diversity.

3. The method defined in claim 1 wherein linearly precoding disjoint sub-blocks of symbol vectors into a set of precoded subvectors further comprises linearly precoding disjoint sub-blocks of symbol vectors and their conjugates into the set of precoded subvectors.

4. The method defined in claim 1 further comprising outputting distinct waveforms for transmission by each transmit antenna of said each base station.

5. The method defined in claim 4 further comprising:
demultiplexing and unpacking symbols of a transmit sample vector to create unpacked data; and
performing pulse-shaping and modulation on the unpacked data to create the at least one waveform.

6. The method defined in claim 1 further comprising combining precoded STBC blocks into a STBC matrix.

7. A base station for use in a communication system that sends an information-bearing sequence to a receiver through cooperation of an arbitrary set of base stations, each base station in the arbitrary set of base stations comprising:

a number of antenna elements;
a processing unit to divide data into blocks and sequentially and independently encode the blocks, wherein the processing unit comprises
a precoder to precode each data block to produce precoded data and create sub-blocks from the precoded data, the precoder being common to base stations in the arbitrary set of base stations, wherein the precoder to precode each data block to produce precoded data comprises the precoder to linearly precode disjoint sub-blocks of symbol vectors into a set of precoded subvectors, and the precoder to create sub-blocks from the precoded data further comprises the precoder to re-interleave elements of the precoded vectors into a new set of vectors,
a space-time block code module to encode sub-blocks of the precoded data independently using a space-time block code (STBC) that is common to base stations in the arbitrary set of base stations, the space-time block code module operable to generate an STBC matrix, and
a post coding module to perform base station specific post coding by projecting the STBC matrix on an individual steering vector that is specific to said each base station and each antenna element to said each base station; and
a transmitter to transmit a waveform that is generated based on data resulting from performing the base-station-specific and antenna-specific post coding.

\* \* \* \* \*